R. D. SMITH.
THERMOSTATICALLY CONTROLLED VALVE.
APPLICATION FILED JULY 24, 1916. RENEWED OCT. 4, 1920.
1,383,573.
Patented July 5, 1921.
2 SHEETS—SHEET 2.
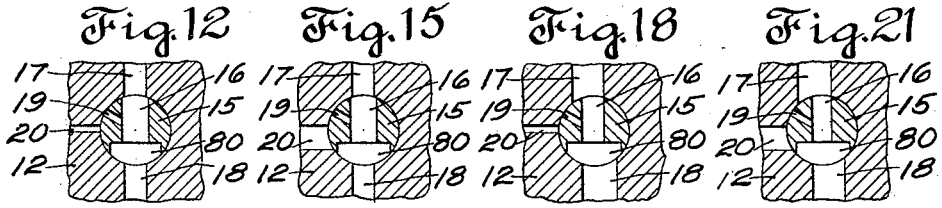
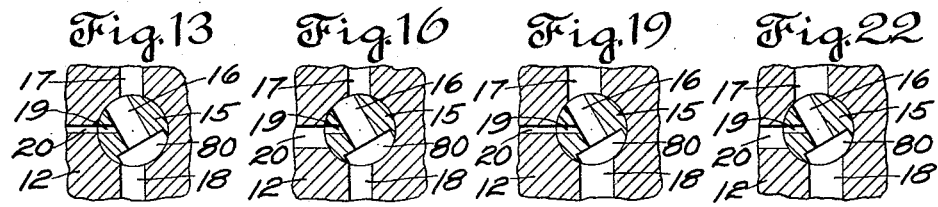
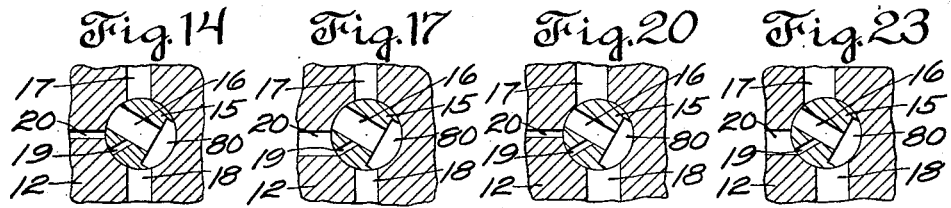
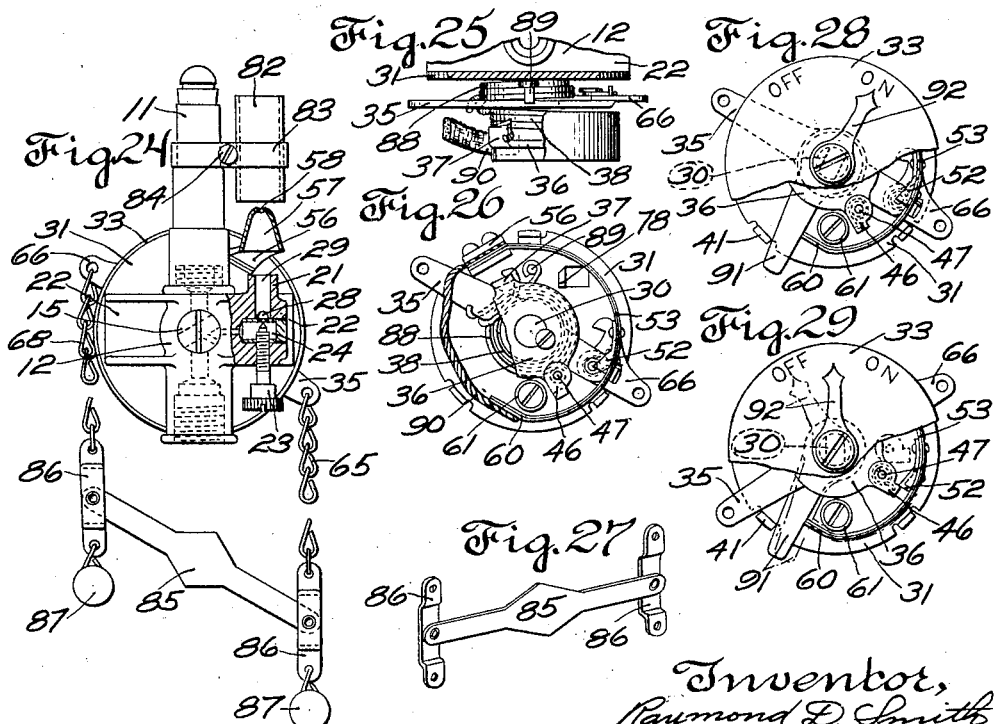

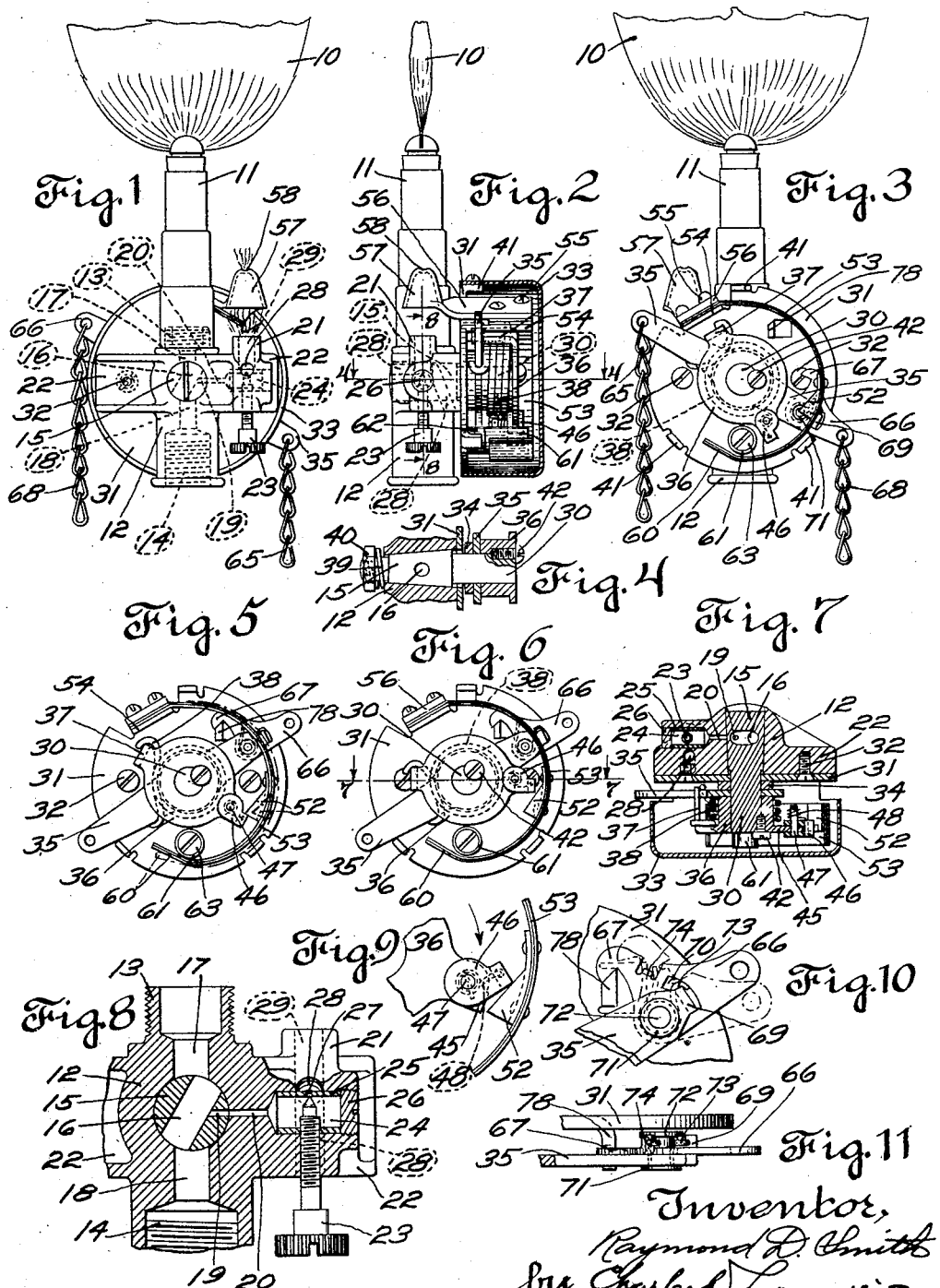

UNITED STATES PATENT OFFICE.

RAYMOND D. SMITH, OF MILTON, MASSACHUSETTS, ASSIGNOR TO SHAWMUT MACHINE WORKS, INC., OF BOSTON, MASSACHUSETTS, A CORPORATION OF MAINE.

THERMOSTATICALLY-CONTROLLED VALVE.

1,383,573.  Specification of Letters Patent.  Patented July 5, 1921.

Application filed July 24, 1916, Serial No. 110,950. Renewed October 4, 1920. Serial No. 414,648.

*To all whom it may concern:*

Be it known that I, RAYMOND D. SMITH, a citizen of the United States, residing at Milton, in the county of Norfolk and State of Massachusetts, have invented certain new and useful Improvements in Thermostatically-Controlled Valves, of which the following is a full and complete description.

My invention relates to automatically controlled valves, and more particularly, but not exclusively, to that type of thermostatically controlled valve adapted to control the supply of gas to a burner located in proximity thereto.

In general, the object of my invention is to provide, in simple and reliable form and in compact and durable arrangement, a thermostatically controlled gas valve in which the flowing gas or other fluid capable of communicating heat, may be utilized at the desired time thermally to energize a controlling thermostat, the coöperative valve and thermostat arrangement being made operative, preferably, simultaneously with, and by, the same governing control movement that brings the thermal energy for the thermostat into operation, to produce, under the control of the thermostat and at a predetermined time, a desired movement of the main valve, which movement I have herein shown as a closing movement.

Applied to a lighting burner, one advantage of such automatic closure of a valve controlling the supply of gas thereto, obviously resides in the means thus provided for causing a belated extinguishment or dimming of the light, after manipulation of the usual control means, and for thereby enabling the operator to see his way in leaving the premises or room dependent upon said burner for light. Accordingly, a particular object of my present invention is to provide a lighting burner structure (including a thermostatically controlled valve as above described) of neat and attractive appearance such that same may be used advantageously as a lighting fixture in a business or domestic establishment, although I do not limit the scope of my invention to such application. An automatic movement of a valve such as I have provided may have many uses, such as to control, at a predetermined time, the heat of a cooking utensil, or the delivery of a fluid such as steam through said valve, in which latter case I may use the flowing steam to thermally energize the controlling thermostat in place of a burning gas as herein disclosed.

Specifically, my invention as herein illustrated, provides means whereby there is incorporated with an illuminating gas burner and the valve mechanism therefor, with suitable modifications and in combination, a thermostatically controlled, spring-motive mechanism for actuating the main valve; an auxiliary burner, normally inactive, and arranged in operation to heat the thermostat; and means associated with the control of the main valve whereby, upon usual manual actuation as adapted to close the main valve, the main valve is not closed, but thermostatically controlled, automatic mechanism is thrown into train to close it when released; and simultaneously with, and by the same movement, a port is opened to supply gas to the separate, small heater burner for heating the thermostat. The latter burner is automatically ignited (preferably by being operably related to the main gas flame); and thereby, after the lapse of a desired period of time, the automatic mechanism is released to close the main valve, and preferably, but not necessarily, also to shut off the gas supply to the burner of the heater for the thermostat.

This accomplishes by simple and reliable means the delayed, automatic extinguishment, or "turn down", of the main burner, in a form where all parts are self-contained by the main burner and valve structure.

I am aware that various means for automatically controlling a supply gas are old. I therefore wish to point out that among the novel features of my present invention which distinguish it from such devices are, in combination, the provision of an auxiliary burner, the supply of gas to which is controlled by the same valve member which controls the supply of gas to the main burner; the construction and arrangement of an auxiliary heater member between the thermostat and this auxiliary burner; the coöperative arrangement of the heater burner, the auxiliary heater member and the main valve and burner whereby reliable automatic ignition of the auxiliary burner from the lighted main burner is secured; and the arrangement of valve mechanism by which the valve has a tendency to move only after and by actuation of extinguishing means and by which, when turned on and ignited, the main or illuminating burner alone is adapted to remain burning for an indefinite period or until subsequent manual actuation of such extinguishing means.

Other details of my invention will appear from the drawings and from the following specifications and claims.

In the drawings—Figure 1 is a rear elevation of a thermodynamically controlled gas valve embodying my present invention, in company with the usual burner stem and tip of an ordinary open-flame gas burner, parts being shown in their position after extinguishing means have been manually operated, and after gas from the auxiliary burner has been ignited by the main flame, or while the thermostat is being heated; Fig. 2 is an elevation with casing cut away looking at the right of Fig. 1 or at the left of Fig. 3, parts being positioned as in the latter; Fig. 3 is a front elevation of the structure shown in Fig. 1 with casing for valve mechanism removed, showing parts in their position during normal operation of the burner; Fig. 4 is a partial section on the line 4—4 in Fig. 2 showing a modified arrangement in valve construction; Fig. 5 is a front view of the mechanism shown in Fig. 3, but with parts positioned as in Fig. 1; Fig. 6 is a view similar to Fig. 5, but showing parts in their position when the valve has been automatically closed; Fig. 7 is a horizontal section taken on the plane 7—7 in Fig. 6; Fig. 8 is an enlarged partial vertical section taken on the plane 8—8 in Fig. 2, better showing the construction of the auxiliary burner and the valve ports; Fig. 9 is an enlarged detail of certain detent parts in a certain relative position; Fig. 10 is an enlarged detail of certain mechanical parts. Fig. 11 is a plan view of these same parts looking down upon Fig. 10. Figs. 12, 13 and 14 are enlarged vertical sections taken through the valve ports and looking from the front of the device or in a direction as in Figs. 3, 5 and 6, showing a possible, slightly modified arrangement of valve ports in positions of the valve plug corresponding to Figs. 3, 5 and 6 respectively; Figs. 15, 16 and 17 are sections similar to Figs. 12, 13 and 14, respectively, but showing another arrangement of valve ports; Figs. 18, 19 and 20 are also sections similar to Figs. 12, 13 and 14, respectively, but showing a different arrangement of valve ports; Figs. 18, 19 and 20 are also sections similar to Figs. 12, 13 and 14, respectively, showing a still different arrangement of valve ports; Fig. 24 is a view similar to Fig. 1 partly in section and showing certain possible additional features advantageous in operation of the device. Fig. 25 is a partial plan view of the valve mechanism with casing removed and with some parts broken away and others omitted for clearness, showing certain additions and modifications whereby useful purposes might be served. Fig. 26 is a front elevation of the mechanism shown in Fig. 25, corresponding parts being positioned as in Fig. 3; Fig. 27 is a detailed perspective view of certain parts of the control chain structure shown in Fig. 24; Fig. 28 is a front view of the mechanism shown in Fig. 3, with casing partially cut away, showing possible useful additions and modifications in said mechanism; Fig. 29 is a view similar to Fig. 28 but showing the parts in a different operative position.

In the following description and in all the views of the drawings, similar parts are indicated by the same numerals.

Referring to the drawings, in Figs. 1, 2 and 3 the illuminating flame of the main burner appears at 10, and the usual burner stem at 11. The latter is mounted upon the main valve block 12 at an externally threaded portion 13 of the latter. An internally threaded portion 14 of the valve block 12 affords means for mounting the entire structure on an ordinary gas bracket or chandelier.

In the valve block 12, intermediate to its threaded portions and at right angles to the axis thereof, is a tapered hole which serves as bearing for the tapered valve plug 15. This valve plug, in the manner of an ordinary gas cock, is perforated midway its length by the diametrically extending passage 16, said passage, in a certain rotative position of the valve plug, being arranged to fall in alinement with corresponding passages or ports 17 and 18 leading to the threaded portions 13 and 14 respectively, of the valve block.

In the same transverse plane with and at an angle to the passage 16 and extending radially from same to the outer surface of the valve plug, is a smaller port 19 which, in suitable rotative position of the valve plug, registers with a small port 20 in the valve block 12, as shown clearly in Fig. 8. The port 20 leads horizontally to an auxiliary burner 21 contained in one of the two bracket-like extensions 22, 22 of the valve block 12. The construction of this auxiliary burner is such as to constitute a form of Bunsen burner wherein a needle valve control of the escaping gas is had by means of the adjustment screw 23. This screw extends upwardly through an enlarged gas chamber 24, that is formed by a counter bore in the valve block in alinement with the small port 20 and by the insertion therein of a short piece of tubing 25, and the subsequent closing of the hole by a gas tight plug 26. The tube 25 is perforated at 27 to allow the escape of gas upwardly, said perforation forming a conical seat for the tapered point of the screw 23 so that the latter may control the flow of gas through this perforation. Admission of air at the point of gas discharge from the perforation 27 is had by means of openings 28, 28 in the valve block, and an upwardly extending opening 29 serves as a mixing chamber for the gas and air so that combustion of the gas may be complete at the upper outlet of the burner, and a hot blue flame produced.

The tapered valve plug 15 has, at the smaller end thereof, in Figs. 2 and 7, a stem 30 extending axially beyond the valve block 12 and through the circular supporting plate 31 which is carried vertically by the valve block and fixed thereto by screws 32, 32. This supporting plate provides in general, a means for conveniently and rigidly carrying the various stationary mechanical parts that coöperate with the movable parts of the valve mechanism and also carries three forwardly extending ears 41 spaced about its periphery. These ears serve as convenient fastening means for a casing 33 which, with the exception of the necessary openings for the extrusion of operative parts, totally incloses the valve mechanism.

As best shown in Figs. 2 and 7, the valve stem 30 has loosely mounted thereon a spacing collar 34 and a double-ended, oscillatory control lever 35, and carries axially external of these parts at its forward end and made fast thereto by the key screw 42, a double-extensional dog member 36. One extension 37 of the dog member 36 is bent backwardly parallel with the axis of the valve stem and engages positively in one rotative direction with the upper edge of the control lever 35.

Loosely coiled about the hub of dog member 36 is a helical wire spring 38 which at one end is hooked about the lower edge of control lever 35 and which at the other end engages with the extension 37 of the dog-member. A slight torsional tension in said spring maintains the control lever and the dog member normally in the relative rotative position shown in Figs. 3 and 6, but by yielding, this spring may allow a relative rotative movement of these parts to the positions shown in Fig. 5, at a certain time in the operation of the valve. A slight axially exerted tension in said spring always maintains the valve plug 15 securely in its seat under uniform axial tension.

In Fig. 4 is shown a possible alternative arrangement of the tapered valve plug 15 wherein the direction of the taper is reversed and a spring washer 39 is inserted under a nut 40 mounted on the smaller end of the valve plug for the purpose of maintaining the plug in its seat under uniform tension. In this case no axial tension should be exerted by the spring 38.

The dog member 36, has a radially extending portion 45 as shown in Figs. 7 and 9, diametrically opposite the extension 37, which portion at its outer end is straddled by yoked latch member 46 pivoted thereto by a stud 47. The stud 47 is fast in the extension 45 but loose in the yoked latch member 46, so that the latter is free to turn in one direction against the tension of a fine wire spring 48, loosely coiled about the stud 47 and at one end fastened thereto as is also best shown in Figs. 7 and 9. The other end of the spring 48 engages the latch member 46 so as normally to maintain the latter positioned against a seat provided by the very extremity of the extension 45. This normal position of the latch member 46 is shown in Figs. 3, 5 and 6. A position of this latch other than normal relative to the extension 45, is shown in Fig. 9 which will be hereinafter referred to.

Lying in the path of movement of the latch member 46, is a spur-shaped detent 52 carried by and securely fastened to the inner face of a curved bi-metallic thermostat 53. This thermostat, in the plane of its least dimension, conforms for the most part to the arc of a true circle substantially concentric with the axis of the valve plug, and comprises two conformed strips of different metals having widely different expansible properties such as brass and steel, and made fast to each other uniformly throughout their length, with the brass or greater expansible metal on the inner side. The thermostat at one end is rigidly mounted to an extension 54 of the supporting plate 31 by screws 55, 55, and in all other parts is free for thermally caused flexure outwardly, or in a "straightening" direction.

A metallic heater member 56 is shown clamped in surface contact with the thermostat at the mounted end thereof and extending rearwardly, outside of the mechanism housing. This heater member as clearly shown in Figs. 1, 2 and 3 terminates in a hollow, conically shaped hood portion 57 having a small opening 58, at its top and lying directly over the auxiliary burner 21 being slightly raised therefrom.

The general position of this hood, which is wholly open at the bottom, and of the small perforation in its top, is such as to fall in vertical alinement with the auxiliary burner 21 and the main flame 10. Gas rising from the burner 21 is therefore collected by the heater hood 57 and allowed to escape upwardly through the opening 58 in the top of same directly toward the flame 10. Upon ignition by the main flame, the gas from the auxiliary burner will burn at the mouth thereof with a hot blue flame. As shown in Fig. 1, this flame plays directly against the heater hood 57, which presents a large area of surface to the hottest part thereof, thus serving in a very efficient manner to extract heat from said flame and to transmit such heat by conduction to the thermostat.

At its free end 60, the curvature of the thermostat departs from conformation to the arc of a true circle and extends somewhat more inwardly. Internally adjacent to, and nearly in contact with, this inwardly curved extremity of the thermostat is a loose roller 61 carried by a stud 62 which is mounted upon the supporting plate 31. A retaining screw 63 serves to keep the roller in place. The function of this roller abutment is to reinforce the thermostat while the latter is operative to restrain the movement of the dog member 36 by engagement of spur member 52 with latch member 46 as shown in Fig. 5.

To one end of the control lever 35 is directly attached a control chain 65, while at the other end, a latch lever 66 is pivoted at 71 for purposes to be hereinafter described. As best shown in Figs. 10 and 11, the latch lever 66 is double-ended and of bell-crank shape, having a catch formation at the end 67 of one arm and carrying at the extremity of its other arm the control chain 68. The extremity 69 of the control arm 35 is bent sharply at right angles and projects through a curved slot 70 in the latch lever 66, and the ends of this slot act as stops to limit the swinging movement of the latch lever about its pivot 71. In the construction adopted, this pivot comprises an eyelet, or hollow rivet 71, made fast in the latch lever 66 but having a loose bearing in the control lever 35. The hollow center of this eyelet is utilized for mounting therein, and concentrically with the pivot, a spring stud 72 which retains a light wire spring 73. This spring bears against the bent extremity 69 of the control lever and on projection 74 of the latch lever 66 in such a way as to normally keep the latch lever in the full line position indicated in Fig. 10, but so that a pull on control chain 68 may swing the latch lever 66 to the broken line position indicated in the same figure.

The latch lever 66 co-acts with a projection 78 of the supporting plate 31 to automatically lock the control lever 35 in the position shown in Figs. 5 and 6 when by a pull on control chain 65 the control lever is made to assume this position. It will be evident from the arrangement of parts that when the control lever is thus locked any rotative tendency of said control will not be effective to accomplish a disengagement of the latch 66 from projection 78, but that a pull on chain 68 will readily effect such disengagement and then that further pull on chain 68 will be positively transmitted to the control lever.

The extension 54 of the supporting plate 31 serves as a stop to limit the clockwise movement of the control lever to the position shown in Fig. 3, whereas the projection 78 limits the movement of this lever in the opposite rotative direction, to the position shown in Figs. 5 and 6, convenient manual control of the control lever being had through the downwardly hanging chains 65 and 68.

In describing the operation of my present invention I will refer to Figs. 18, 19 and 20 which show a partial section through the operative gas ports (here shown slightly modified) wherein the main passage 16 in the valve plug 15 is enlarged at one end by a counterbored recess 80 and wherein the corresponding passages 17 and 18 in the valve block are slightly offset for reasons to be made apparent.

Starting from the position of parts as in Figs. 3 and 18 where the valve is arranged for normal supply of gas to the main burner for illuminating purposes for an indefinite period, when it is desired to extinguish the light, control chain 65 is pulled downwardly which rotates the control lever 35, and through the medium of spring 38, the dog member 36, in unison, until the latter is intercepted by engagement of its latch member 46 with the spur detent 52. The control lever however, is now swung farther against the tension of spring 38 until it is automatically locked in the position shown in Fig. 5 as heretofore described. Corresponding to the position of dog member 36 in Fig. 5, the valve plug is now positioned as in Fig. 19, where it is clearly shown that no reduction of the gas supply to the main burner has been caused by movement of the valve plug, but where the auxiliary port 19 in the valve plug has been made to register with the auxiliary port 20 in the valve block. Gas is now supplied to the auxiliary burner 21 and ignites from the main flame as heretofore described, both main and auxiliary flames burning as shown in Fig. 1. As heat is fed into the thermostat by the heater member 56, the former bends outwardly to the broken line position indicated in Fig. 5, thus releasing the dog member 36 which is thereupon impelled to the position shown in Fig. 6 by the tension in spring 38. This latter movement of the dog member rotates the valve plug 15 to the position shown in Fig. 20. Here the gas supply to both main and auxiliary burners has been shut off and complete extinguishment of the light thereby effected.

When it is again desired to light the main burner, control chain 68 is pulled, which first disengages the latch 66 from projection 78 and then swings control lever 35 and thereby dog member 36 by positive engagement therewith, to the position shown in Fig. 3. In this latter movement of the dog member 36, the latch member 46 will yield, as shown in Fig. 9, when passing the spur detent 52, if the latter at that time has been restored to its normal position by cooling of the thermostat. The main burner may now be lighted and the parts will remain in this position until the chain 65 is again pulled to extinguish the light.

The foregoing description concerns a preferred embodiment of my invention in its simplest form. There are, however, many additions and modifications which can be made in the structure to serve useful purposes, some examples of which I will now describe.

In Fig. 12, I have shown an arrangement of operative gas ports whereby in the intermediary position of the dog member 36 as shown in Fig. 5, the passage from port 16 into port 17 is partially constructed and the supply of gas to the main burner thereby reduced as shown in Fig. 13, so that a perceptible dimming of the light is produced simultaneously with the pulling of control chain 65. It should be noted however, that the passage from port 16 to port 18 remains unconstricted due to the counter-bored end of the former allowing ample supply of gas for the auxiliary burner. Fig. 14 shows the position of parts after thermostatic release and consequent closing of the valve, the gas supplied to both auxiliary and main burners being completely cut off.

In Figs. 15, 16 and 17 an arrangement of ports is shown whereby the same initial dimming of the light occurs as with the arrangement in Figs. 12, 13 and 14. But here the auxiliary port 20 in the valve block is larger, so that gas is delivered to the auxiliary burner and continues to burn indefinitely as a pilot light after extinguishment of the main burner light, as shown in Fig. 17.

Figs. 21, 22 and 23 show an arrangement of ports whereby the supply of gas to the main burner is not reduced in the intermediary position of the valve plug and where, also, gas is supplied to the auxiliary burner after extinguishment of the main burner light.

In Fig. 24 I have shown a hollow, cylindrical chimney 82, fully open at both top and bottom. This chimney is held in a vertical position adjacent to the burner stem 11 by a clamping band 83 extending around the latter, and secured by a clamping screw 84. The bottom of the chimney 82 falls slightly above the heater hood 57 so that gas arising from the small opening in the latter is guided upwardly toward the main burner flame. More reliable ignition of the auxiliary burner is thereby secured, since the chimney 82 effectively protects the rising gas from diffusion or diversion due to accidental air currents or drafts.

Fig. 24 also shows a terminal arrangement for the control chains 65 and 68 which, without interfering with the normal operation thereof, serves to keep the chains properly spaced and in proper alinement even when subjected to the snapping tendency of the spring actuated parts. This terminal arrangement consists of a flat rigid bar 85 extending between the chains and loosely hinged at each end to vertical links 86, 86 at the end of each chain. The links 86, 86 are equally spaced from the terminals of the control lever 35 by equal lengths of chain, so that the bar 85 is maintained in a position substantially parallel with the control lever at all times. Ball terminals 87, 87 are hung at the lower ends of the links 85, 85 for convenience in grasping the chain. Fig. 27 shows the bent form of the links 86, 86 which serves to prevent a complete turn of the same and a consequent kinking of the chain.

It will be evident that in the mechanism heretofore described it would be possible by incorrect manipulation of the control chains to position control lever 35 horizontally, or midway between the extreme positions shown in Figs. 3 and 5. This would result in a position of the valve plug such as that shown in Figs. 8, 13, 16, 19 or 22 wherein gas would be supplied to the auxiliary burner and ignited without means having been made operative to close the valve upon heating of the thermostat. To prevent such a condition, I may introduce a spring such as the coiled helical spring 88 in Figs. 25 and 26 mounted concentrically with the valve stem 30 between the support plate 31 and the control lever 35. One end of the spring is shown attached to a stud 89 in the support plate and the other end engages with the lower edge of control lever 35 normally maintaining the latter in the position shown in Fig. 26 or in the correct position for normal operation of the main burner.

In Figs. 25 and 26 is also shown a flexible metallic heat conductor 90, extending from between the mounted ends of the thermostat and the heater member 56 to the free end 60 of the former, to which it may be secured in good surface contact by hard solder. The flexible nature of this heat conductor may consist in a braided or woven strip of fine wire strands or metallic foil may be used. The metal may be copper if a very effective conductor is required, although nearly any metal of as good heat conductivity as brass, would serve the purpose of making more rapid the heating of the thermostat by conduction of heat from the auxiliary burner. In fact, were it desirable, the entire thermostat might be incased in thin copper foil, the latter helping to more readily conduct the heat from the heater member to remote parts of the thermostat without impairing the flexure of the latter.

In Figs. 28 and 29, I have shown provision of manual means for causing the thermostat to release the dog member 36 by an arm 91 loosely pivoted on the valve stem 30 and positioned axially in the place of the loose collar 34 shown in Fig. 7. This arm 91 extends radially outside the casing and past the free end of the thermostat, falling axially in alinement with same so that displacement of the arm to the broken line position shown in Fig. 29 causes a flexure of the thermostat such as to disengage the spur detent 52 from the latch member 46 and thus to release the dog member 36. When cool the thermostat acts as a spring to keep the releasing arm 91 normally in contact with the stop ear 41. I have also shown in Figs. 28 and 29 an indicator hand 92 which may be fixedly mounted to the end of valve stem 30, the latter extending through a central opening in the casing 33 for this purpose. Different positions of this indicating hand are shown with corresponding position of parts of the mechanism.

It is clear that this indicator hand, being always in fixed rotative relation to the valve plug 15, will in all positions indicate the true condition of the valve as whether shut, open, or partially open.

It will be understood that many other modifications or equivalents, entirely within the spirit of my invention, could be introduced into the structure I have disclosed, such as a different means for igniting the auxiliary burner, or different provision for manual control of the device. Among possible means for accomplishing the ignition of the auxiliary burner for instance, is the well known black platinum method.

The designed time interval required for raising the temperature of the thermostat to the requisite point for releasing the dog member 36 is capable of considerable variation. In use of a lighting structure such as I have chosen to describe as a preferred embodiment of my invention, this time interval might advantageously range from 1 to 3 minutes. It will be obvious that factors determining the time interval may consist in the amount of normal engagement between latch member 46 and spur detent 52, or in the nature and length of the metallic path which the heat must traverse in reaching free portions of the thermostat from the auxiliary flame.

This last consideration may involve not merely the length of said path, or the provision of additional heat conductors such as the flexible strip 90 or a foil casing for the thermostat as heretofore referred to, but may include the use of a variety of metals of which the heater member 56 itself could be composed such metals having materially different heat conductive qualities, such as copper, brass and steel. Obviously, provision of heat insulation between the thermostat structure and the metallic parts supporting it would tend to prevent the escape of heat to the latter and thus make more efficient the conveyance of heat to the thermostat.

Although I have chosen to disclose herein a structure wherein use is made of a flexing bi-metallic thermostat for causing a delayed automatic actuation of the valve, it will be obvious that by appropriate re-design, other types of thermostats could be used equally well for the desired purpose, or if desired, the interval of delay may be produced by other means than that of heat transmission to a thermostat. Equivalent types of slow-acting mechanical devices are well known in the art, and the use of such equivalents to produce the novel operative principles of gas burner control that are disclosed herein, is entirely within the broad scope of my invention as defined in certain of the appended claims. I have not deemed it essential to illustrate or describe many of the apparent different forms which various details of my present invention might assume. It will be seen that the broad construction and arrangement herein described and claimed, with suitable adaptation of parts as necessary, may be adapted to use with Bunsen burners, and specifically with incandescent or mantle burners embodying a Bunsen burner as well known in the art. Without therefore limiting my invention to the herein disclosed embodiment, what I claim is:—

1. In combination; a main conduit for a heat productive fluid; a valve connected in said conduit to govern the flow of said fluid therethrough; mechanism adapted automatically to actuate said valve; a thermostat arranged to be operatively energized by heat from a diverted portion of said fluid, and to govern the automatic actuation of said valve; an auxiliary conduit for conducting said diverted fluid portion, and arranged to be closed when said valve is normally opened; and control means for separately opening said auxiliary conduit, to energize said thermostat, thereby to effect a designed automatic actuation of said valve.

2. A self-contained gas burner and controlling valve embodying, in combination with a main burner and a main valve for regulating the supply of gas thereto; mechanism adapted automatically to actuate said valve; a thermostat arranged to govern the automatic actuation of said valve, an auxiliary burner for operatively energizing said thermostat; and an auxiliary conduit for conducting gas to said auxiliary burner and arranged to be closed when said valve is opened for normal continuous operation of said main burner; together with means for separately opening said auxiliary conduit, thereby to render operative said auxiliary burner for effecting a designed automatic actuation of said valve.

3. In combination; a main conduit for a heat productive fluid; a valve connected in said conduit to govern the flow of said fluid therethrough; mechanism adapted automatically to actuate said valve; a thermostat arranged to be operatively energized by heat from a diverted portion of said fluid, and to govern the automatic actuation of said valve; an auxiliary conduit for conducting said diverted fluid portion, and arranged to be closed when said valve is normally opened; and common control means arranged by one movement to open said valve and close said auxiliary conduit and by another movement to energize said mechanism and open said auxiliary conduit.

4. A self-contained gas burner and controlling valve arrangement embodying, in combination with a main burner and a main valve for regulating the supply of gas thereto; mechanism adapted automatically to actuate said valve; a thermostat arranged to govern the automatic actuation of said valve; and an auxiliary burner for operatively energizing said thermostat; together with a common control device operatively related to said valve and to said conduit, whereby one movement of said device opens said valve and cuts off the supply of gas to said auxiliary burner, and another movement of said device delivers gas to said auxiliary burner to cause the operative energization of the thermostat.

5. A self-contained gas burner and controlling valve arrangement embodying, in combination with a main burner and a main valve for regulating the supply of gas thereto; mechanism adapted automatically to actuate said valve; a thermostat arranged to govern the automatic actuation of said valve; an auxiliary burner for operatively energizing said thermostat and adapted when supplied with gas to be automatically ignited; and an auxiliary conduit for conducting gas to said auxiliary burner, and arranged to be closed when said valve is opened for normal and continuous operation of said main burner; together with means for separately opening said auxiliary conduit, thereby to render operative said auxiliary burner for effecting a designed automatic actuation of said valve.

6. A self-contained gas burner and controlling valve arrangement embodying, in combination with a main burner and a main valve for regulating the supply of gas thereto; mechanism adapted automatically to actuate said valve; a thermostat arranged to govern the automatic actuation of said valve; an auxiliary burner for operatively energizing said thermostat and disposed relative to the said main burner to be automatically ignited thereby when supplied with gas; an auxiliary conduit for conducting gas to said auxiliary burner, and arranged to be closed when said valve is opened for normal and continuous operation of said main burner; together with means for separately opening said auxiliary conduit, thereby to render operative said auxiliary burner for effecting a designed automatic actuation of said valve.

7. In combination with a conduit for a fluid capable of communicating heat,— a self-contained valve and operating mechanism therefor, comprising with a movable member of said valve, means adapted automatically to actuate the same, a thermostat and detent controlled thereby arranged normally to withhold said means from action when the latter are energized, a normally closed auxiliary port in said movable valve member arranged when opened to divert a part of the flowing fluid operatively to energize the thermostat, and controlling means adapted by a single movement thereof to energize said valve member actuating means and to open said normally closed port.

8. A self-contained gas burner and controlling arrangement, comprising in combination with the main burner and valve therefor, normally inactive automatically acting means including a controlling thermostat, said means being operatively related to a movable member of said valve to actuate the same, an auxiliary heater burner for the thermostat with the gas supply therefor arranged to be cut off by said movable valve member when the latter is normally positioned to supply gas to said main burner, and a control device for said movable valve member by a single movement of which said thermostat may be operatively energized and said automatically acting means rendered operative to actuate said valve member.

9. A self-contained gas burner and controlling arrangement comprising in combination with the main burner and valve therefor, normally inactive automatically acting means including a controlling thermostat, said means being operatively related to a movable member of said valve to actuate the same; an auxiliary heater burner, adapted to be automatically ignited by the flame of the main burner, for the thermostat with the gas supply therefor controlled by said movable valve member, and a control device for said movable valve member, by a single movement of which said thermostat may be operatively energized and said automatically acting means rendered operative to actuate said valve member.

10. A self-contained gas burner and controlling valve arrangement comprising, in combination with the main burner, an auxiliary burner normally inoperative and positioned to be automatically ignited from the main burner;—a common valve member with separate port controls for said two burners;—normally inactive and deënergized automatically-acting means operatively related to said valve member and adapted when energized and released to actuate said valve member to close the ports therefor, said automatic means including a controlling thermostat operably related to said auxiliary burner;—and unitary manually-operable controlling means for the arrangement, operatively related to said valve member and to said automatic means, and adapted upon suitable movement thereof to open the main burner port and close the auxiliary burner port, and upon reverse movement thereof to open said auxiliary burner port and to energize said automatic means for action when later released by said thermostat, thereby to close both said ports.

11. In a gas valve structure, including a main and an auxiliary burner, in combination, a valve member adapted to control the supply of gas to both the main and auxiliary burners, manually operable control means for said valve member adapted by suitable actuation to position said valve member to supply gas to the main burner alone, and upon further actuation to position said valve member to supply gas to both the main and auxiliary burners and to tension said valve member for further automatic movement, detent means for maintaining the valve member in said tensioned position; together with a controlling thermostat subject to the heat of the auxiliary burner and thereby made operative to cause a movement of said detent means and thereby to release said valve member.

12. In a gas valve structure, including a main, light-producing burner and an auxiliary heat-producing burner coöperatively related in position so that gas from said auxiliary burner may be automatically ignited by the heat from flame of said burner, in combination, a single, oscillatory valve member adapted by an arrangement of ports therein to control the supply of gas to both the main and auxiliary burners, manually operable control means for positioning said valve member to supply gas to the main burner alone, manually operable means for positioning said valve member by movement in reverse direction to supply gas to both main and auxiliary burners and for tensioning said valve member for further movement in said reverse direction, detent means arranged normally to prevent said further movement of the valve member in said reverse direction, a thermostat arranged when energized to cause a movement of said detent means and thereby to release said valve member, and means for conducting heat from the flame of said auxiliary burner to the thermostat comprising a metallic heater member extending from surface contact with said thermostat to the flame of the auxiliary burner and there terminating in a hood shaped formation, perforated to allow a passage of gas therethrough substantially in the direction of heat from the flame of the main burner.

13. In a gas valve structure including a main burner and an auxiliary burner, in combination, a single valve member adapted to control the supply of gas to both the main and auxiliary burners, manual control means for positioning said valve member to supply gas to the main burner alone, reverse acting, manual control means for positioning said valve member to supply gas to both main and auxiliary burners and for tensioning said valve member for further movement, detent means normally operative to prevent said further movement of the valve member, and a thermostat subject to heat from the auxiliary burner and thereby energized to move said detent means and release said valve member.

14. In a gas valve structure including a plurality of burners, in combination, a single valve member adapted to control the supply of gas to a main burner and to an auxiliary burner, manual means for making said valve member permanently operative to supply gas to the main burner alone, manual means for making said valve member operative to supply gas to both the main and auxiliary burners for a predetermined time, and automatically acting means operatively related to said valve member and operably related to said auxiliary burner and to said latter manually operable means for varying the supply of gas to the main burner.

15. In a gas valve arrangement including a plurality of burners and having means adapted, upon energization and release, to actuate the valve thereof, in combination, interrelated means for controlling the supply of gas to two of said burners, comprising manually operable means for said interrelated means adapted upon one actuation to cause a delivery of gas to a main burner and upon another actuation to cause a delivery of gas to an auxiliary burner, said latter actuation being also operative to energize automatically acting means for later actuation of the valve.

16. In a thermostatically controlled valve having a single movable member adapted to control the supply of a fluid to a plurality of conduits therethrough in combination, automatically acting means operatively connected to said valve member, manually operable means for permanently positioning said valve member by one actuation thereof to open a passage for said fluid to one conduit alone, and for positioning said valve member by another actuation thereof to open an additional passage to another conduit and also to energize said automatically acting means, detent means arranged normally to restrain said valve member in said latter position against the action of said automatically acting means, together with a thermostat adapted to be thermally energized by fluid delivered through said additional passage, and thereby made operative to release said valve member by causing a movement of said detent means.

17. In a valve and automatic actuating means arrangement, said means embodying a controlling thermostat in combination an auxiliary Bunsen gas burner the flow of gas to which is controlled by said valve, and a mono-metallic heat conducting member for said thermostat terminating in a hollow, conical, hood portion perforated at the top and positioned directly above and slightly raised from said burner.

18. In a valve and automatic actuating means arrangement, in combination, an auxiliary gas burner with control means for the supply of gas thereto, a thermostat operatively related to said automatic actuating means, and a stationary metallic member of high heat conductivity in contact with said thermostat and extending therefrom to the flame of said burner, there terminating in a hooded portion whose interior surface is exposed to said flame and whose wall is perforated.

19. In a valve and automatic actuating means arrangement, in combination, a bi-metallic resilient thermostat operatively related to said automatic actuating means, a casing inclosing said means and said thermostat, and a manually operable member protruding exterior of said casing and engaging said thermostat to cause a flexure of the latter substantially similar to its designed thermally caused flexure.

20. In a valve and automatic actuating means arrangement, in combination, a bi-metallic resilient thermostat operatively related to said automatic actuating means, a casing inclosing said means and said thermostat, and a manually operable member protruding exterior of said casing and engaging said thermostat to cause a flexure of the latter substantially similar to its designed thermally caused flexure, together with a stop for said member limiting the movement of the latter against the flexural stress in said thermostat so that said movement shall not exceed the elastic limit of the thermostat.

21. In a valve and automatic actuating means arrangement, said means including a controlling thermostat, in combination, a rigid, stationary, heat-conductive member for said thermostat connected to a stationary portion thereof, and a flexible heat-conductive connector extending from said rigid heat-conductive member to a free and movable portion of said thermostat.

22. In combination with a thermostatically controlled valve and burner structure having a plurality of burners and a heat conducting member for the thermostat terminating in a perforated portion above one of said burners, an unconstricted chimney positioned and formed at its lower end to receive the gas escaping upwardly through said perforated portion of the heat conducting member without impairment of free passage for air through this end of the chimney, said chimney leading upwardly to an outlet therein disposed toward the heat of combustion at another burner.

23. A gas burner controlling apparatus including a plurality of burners; means for controlling the supply of gas to said burners; and mechanism operatively related to said means for automatically varying said supply of gas, said mechanism being operably related to one of said burners and arranged normally to be inoperative while another of said burners is constantly supplied with gas; together with means to render operative said one of said burners and thereby said mechanism, automatically to vary said supply of gas to both of said burners.

24. A gas burner controlling apparatus including, in combination; a plurality of burners; a common controlling valve for said burners, said valve being arranged when normally open to render inoperative one of said burners; and mechanism including a thermo-dynamic device, adapted automatically to actuate said valve,—said thermo-dynamic device being arranged to be operatively energized by said one of said burners; together with means for rendering the last mentioned burner operative, so to energize said device.

25. A gas valve governing apparatus embodying, in combination with an oscillatory gas port control member; an oscillatory actuator element mounted to swing with, and positively to impel, said member in one direction of its oscillation, and further arranged for swinging displacement relative to said member in the opposite direction of oscillation; a spring connection between said element and said member whereby said relative displacement of said element tensions said member for follow-up movement from a port opening to a port closing position; a detent arranged to prevent said follow-up movement of said member when said element is displaced therefrom; means to hold said element so displaced; and normally inactive slow-acting instrumentalities arranged to be operatively energized when said element is so displaced, and thereby rendered active to free said member from said detent after a predetermined interval of time.

Signed in Boston, Massachusetts, this 22nd day of July, 1916.

RAYMOND D. SMITH.

Witnesses:
E. L. McFadden,
J. E. Blackman.